Figure 1:
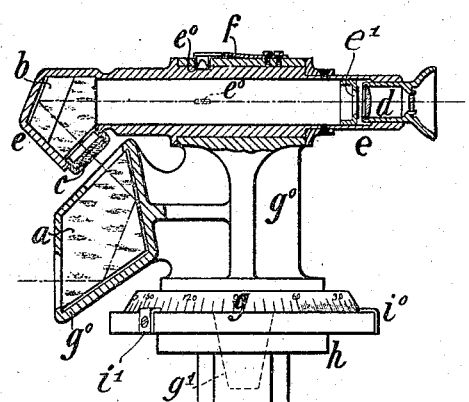

A. KÖNIG.
TELESCOPIC SIGHT FOR ORDNANCE.
APPLICATION FILED OCT. 6, 1908.

937,245.

Patented Oct. 19, 1909.

Witnesses:
Paul Krügel
Fritz Sander

Inventor:
Albert König

UNITED STATES PATENT OFFICE.

ALBERT KÖNIG, OF JENA, GERMANY, ASSIGNOR TO FIRM OF CARL ZEISS, OF JENA, GERMANY.

TELESCOPIC SIGHT FOR ORDNANCE.

937,245.  Specification of Letters Patent.  Patented Oct. 19, 1909.

Application filed October 6, 1908. Serial No. 456,482.

*To all whom it may concern:*

Be it known that I, ALBERT KÖNIG, a citizen of the German Empire, and residing at Carl-Zeiss strasse, Jena, in the Grand Duchy of Saxe-Weimar, Germany, have invented a new and useful Telescopic Sight for Ordnance, of which the following is a specification.

The object of the invention is a telescopic sight for ordnance similar to that of Patent 835,625. With the rotatable double sight according to that patent the layer can sweep the whole horizon and in this way aim at any auxiliary object whatever without altering the direction of his inspection through a greater angle than 90° toward the right and 90° toward the left.

According to the present improvement the sight is constructed with a triple telescopic system in order to reduce the rotation of the sight and hence the alteration of the direction of the vision to less than 90° on either side. In the triple telescopic system of the improved sight the three axes of the entering rays form three angles, of which each is less than 180°. The three axes of the emerging rays coincide. The triple telescopic system contains two reflecting prisms as essential components, one prism being fixed and the other rotatable about its own axis of exit and both prisms having the same angle of deflection, which must lie between 90° and 180°. The objective of the telescopic system is arranged behind the rotatable prism, or else in front of it, but in the latter case always rigidly connected with it. The fixed prism is given a position, in which the principal plane of reflection lies vertically, a " vertical " position, in such a manner above or below the rotatable one, that it lies in front of the rotatable prism, so that the order of reflection of the two prisms is alternate, when the rotatable prism is given its vertical position. In the latter case the telescope is directed forward. In the two horizontal positions of the rotatable prism, the fixed one takes no part, and the telescope is in the one position directed toward the right and rear, in the other toward the left and rear. The erection of the image projected inverted by the objective can be obtained either wholly or in part by either of the two prisms, by the rotatable one in all three telescopes, by the fixed one in the telescope directed forward. If the rotatable prism be constructed as a simple ridge prism for completely erecting the image, that is to say, be only provided with two reflecting surfaces which lie at an inclination of 90° to one another with their ridge in the principal section of the prism, the fixed prism, in order to obviate any alteration in the position of the image, should have one of the double reflecting forms in which the two reflecting surfaces lie one behind the other. If it be intended to give the three telescopes inspection in a downward sloping direction, a simple reflecting prism of less than 90° deflection may, in its vertical position, be combined with the ocular. A simple reflecting rotatable prism then suffices in both its horizontal positions to complete the erection of the image. In the vertical position of the rotatable prism its effect upon the position of the image is annulled by the ocular prism. To completely erect the image in this telescope directed forward the fixed prism is therefore suitably constructed as a simple ridge prism.

Figure 2:
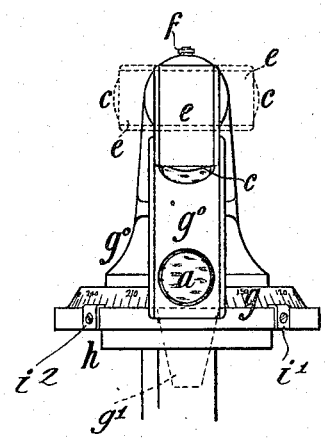
Figure 3:
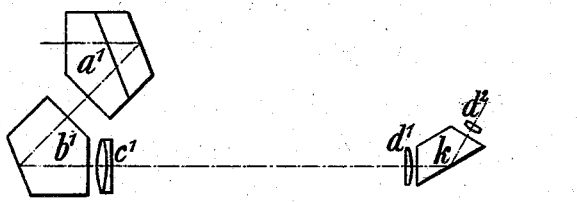
Figure 4:
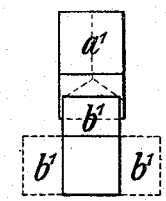

In the annexed drawing: Figure 1 is a side view partly in section of a telescopic sight constructed according to the invention. Fig. 2 is a back view of the same telescopic sight. Fig. 3 is a side view of the optical parts of a second telescopic sight constructed according to the invention. Fig. 4 is a back view of the parts shown in Fig. 3.

Referring to the example shown in Figs. 1 and 2, the double reflecting fixed prism $a$ is located below the ridge prism $b$, the latter being rotatable about its own axis of emergence. The rotatability of the prism $b$ depends, in the example represented, upon the prism $b$ being rigidly built in between the objective $c$ and the ocular $d$, the casing $e$ of which is rotatable about the ocular axis. Three notches $e^0$ on the casing $e$, which stand 90° apart, secure, in combination with the spring catch $f$, the three positions of the casing $e$, namely, the one represented, which corresponds to the forward directed telescope, and the two other positions lying 90° right and left of the former, which are indicated in Fig. 2 by dotted lines and correspond to the left and rear as well as the right and rear directed telescope. Cross wires $e^1$ are suitable for all three positions of the casing $e$. The fixed prism $a$ belongs only to the telescope directed forward. It is fixed in the bearing of the telescope $g^0$, which forms one piece with the scale-disk $g$ and is rotatably mounted in the head $h$ of the sight bar by means of a pivot $g^1$. The head $h$ carries three indices $i^0$ $i^1$ $i^2$, one for each position of the casing $e$.

In the example shown in Figs. 3 and 4 the ocular $d^1$ $d^2$ equipped, for downward inspection, with the simple reflecting prism $k$ must remain in its vertical plane and may for this reason be housed in the same casing along with the vertical thread $c^2$ and the fixed ridge prism $a^1$. The objective $c^1$ may be rigidly connected or not with the simple reflecting prism $b^1$ rotatable about the axis of the objective. The forward directed telescope is again represented, the other two being indicated in Fig. 4 by the horizontal positions of the prism $b^1$ shown in dotted lines.

I claim:

1. A gun sight for ordnance consisting of a telescopic system which comprises an objective, an ocular and two reflecting prisms, a carrier for this system, a base on which the carrier is mounted so as to be rotatable in a horizontal plane and means for indicating the angular position of the axis of entrance relatively to the base, both prisms having the same angle of deflection between 90° and 180°, one being next the objective and rotatable about its own axis of exit and the other being fixed in the plane occupied by the first in its vertical position, so as to serve for the entrance of the rays in the said position of the first prism.

2. A gun sight for ordnance consisting of a telescopic system which comprises an objective, an ocular and two reflecting prisms, a carrier for this system, a base on which the carrier is mounted so as to be rotatable in a horizontal plane and means for indicating the angular position of the axis of entrance relatively to the base, both prisms having the same angle of deflection between 90° and 180°, one being next following the objective and rigidly connected to it, both the objective and this first prism being rotatable about the axis of exit of the prism, the other prism being fixed in the plane occupied by the first in its vertical position, so as to serve for the entrance of the rays in the said position of the first prism.

3. A gun sight for ordnance consisting of a telescopic system which comprises an objective, an ocular and two reflecting prisms, a carrier for this system, a base on which the carrier is mounted so as to be rotatable in a horizontal plane and means for indicating the angular position of the axis of entrance relatively to the base, both prisms having the same angle of deflection between 90° and 180°, one of the prisms being a ridge prism next the objective and rotatable about its own axis of exit and the other being a double reflecting prism fixed in the plane occupied by the first in its vertical position, so as to serve for the entrance of the rays in the said position of the first prism.

ALBERT KÖNIG.

Witneseses:
PAUL KRÜGER,
FRITZ SANDER.